United States Patent [19]

Koske et al.

[11] Patent Number: 5,310,239
[45] Date of Patent: May 10, 1994

[54] MODULAR CAB AND SLEEPER STRUCTURAL ASSEMBLY FOR A TRUCK-TRACTOR VEHICLE

[75] Inventors: Charles E. Koske, Fremont; Huston R. Marlowe, Orinda; Jeffrey E. Paul, Union City; Richard D. Chapman; James P. Bingaman; both of Fremont, all of Calif.

[73] Assignee: PACCAR Inc, Bellevue, Wash.

[21] Appl. No.: 20,353

[22] Filed: Feb. 22, 1993

[51] Int. Cl.⁵ ............................................. B60P 3/32
[52] U.S. Cl. .................... 296/190; 296/24.1; 180/89.12
[58] Field of Search .................... 296/190, 24.1; 180/89.12

[56] References Cited

U.S. PATENT DOCUMENTS

| | | | |
|---|---|---|---|
| 4,511,175 | 4/1985 | Gellenbeck | 296/190 |
| 4,775,179 | 10/1988 | Riggs | 296/190 |
| 4,978,163 | 12/1990 | Savio | 296/190 |
| 5,083,834 | 1/1992 | Moffatt et al. | 296/190 |

*Primary Examiner*—Robert R. Song
*Attorney, Agent, or Firm*—Flehr, Hohbach, Test, Albritton & Herbert

[57] ABSTRACT

A modular cab/sleeper structural assembly (31) for a truck-tractor vehicle (30) is provided which improves ride quality and structural integrity without substantially increasing the overall weight or sacrificing any advantages of separate cab and sleeper units. The assembly (31) includes a chassis frame (33) extending substantially longitudinal of the vehicle (30) and a cab unit (35) having a cab structural assembly (37) mounted to the chassis frame (33) by a first mount (42). A sleeper unit (38) having a sleeper structural assembly (40) is mounted to the chassis frame (33) by a second mount (43). A coupling member (41), coupled between the cab structural assembly (37) and the sleeper structural assembly (40) and independent of the chassis frame (33), rigidly couples the sleeper structural assembly (40) and the cab structural assembly (37) together to produce a substantially unified composite structure for increased structural integrity. A method for improving ride quality and structural integrity of the modular cab/sleeper structural assembly (31) is also provided.

21 Claims, 5 Drawing Sheets

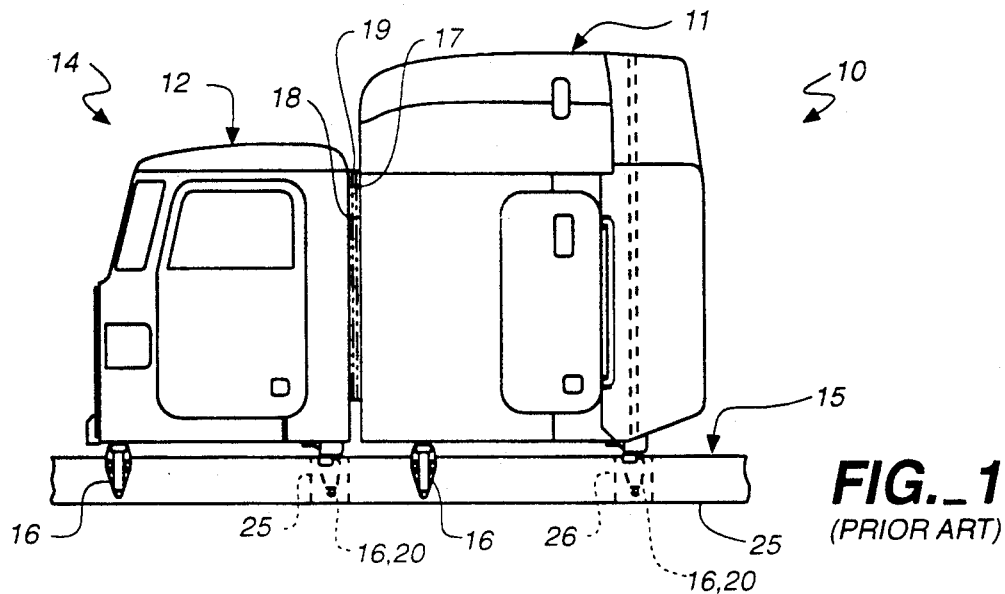
FIG._1
(PRIOR ART)
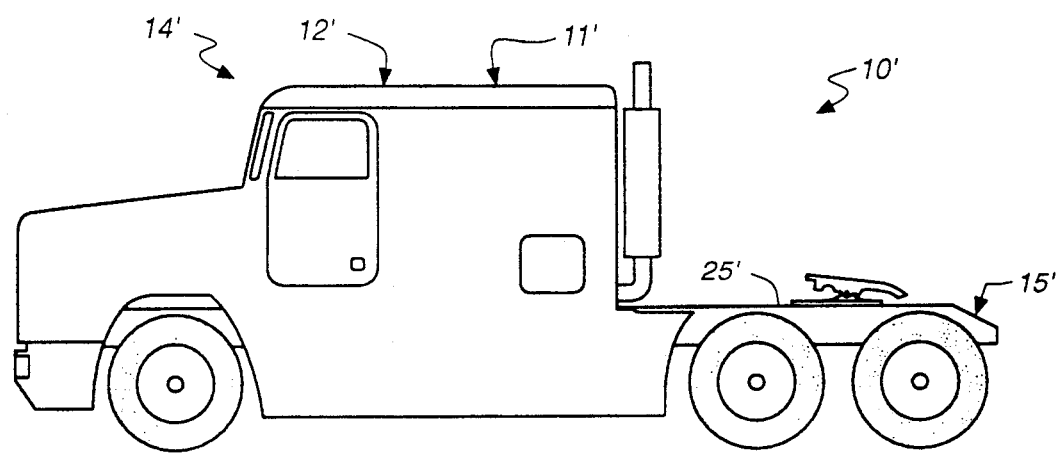
FIG._2
(PRIOR ART)
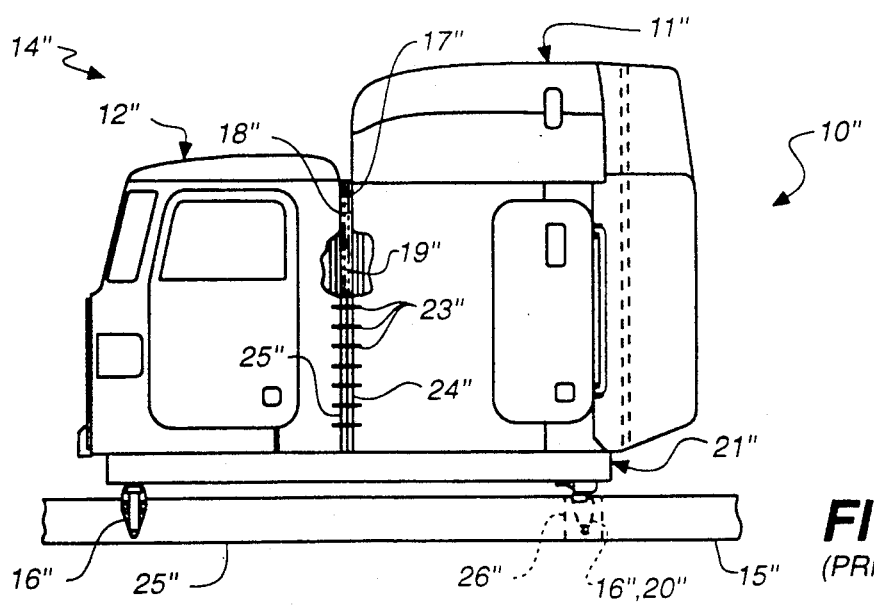
FIG._3
(PRIOR ART)

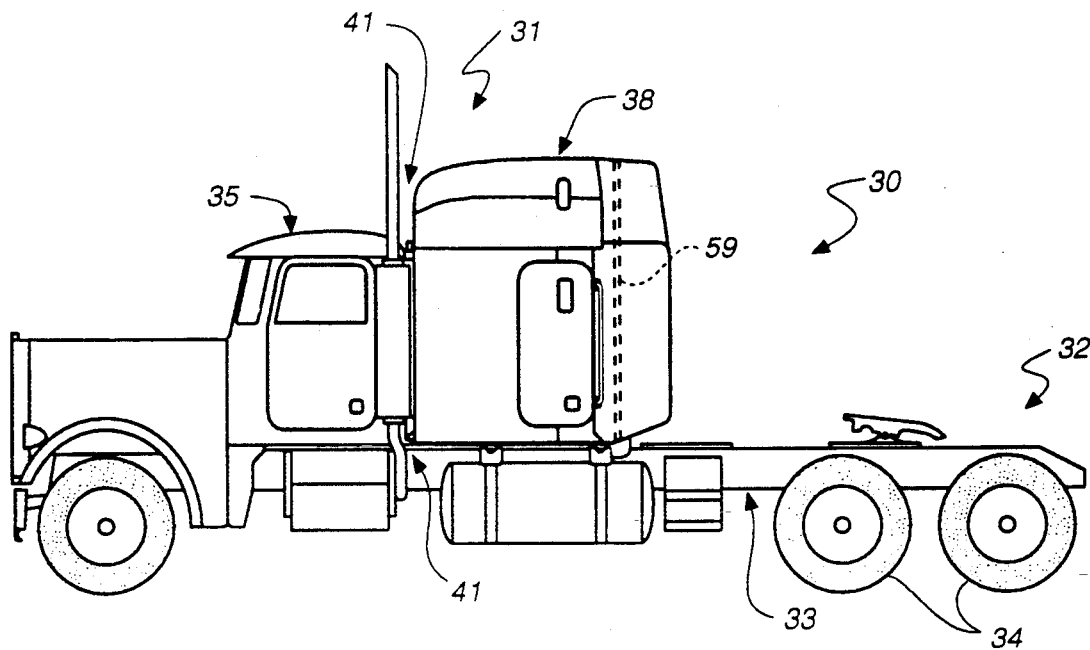
FIG._4
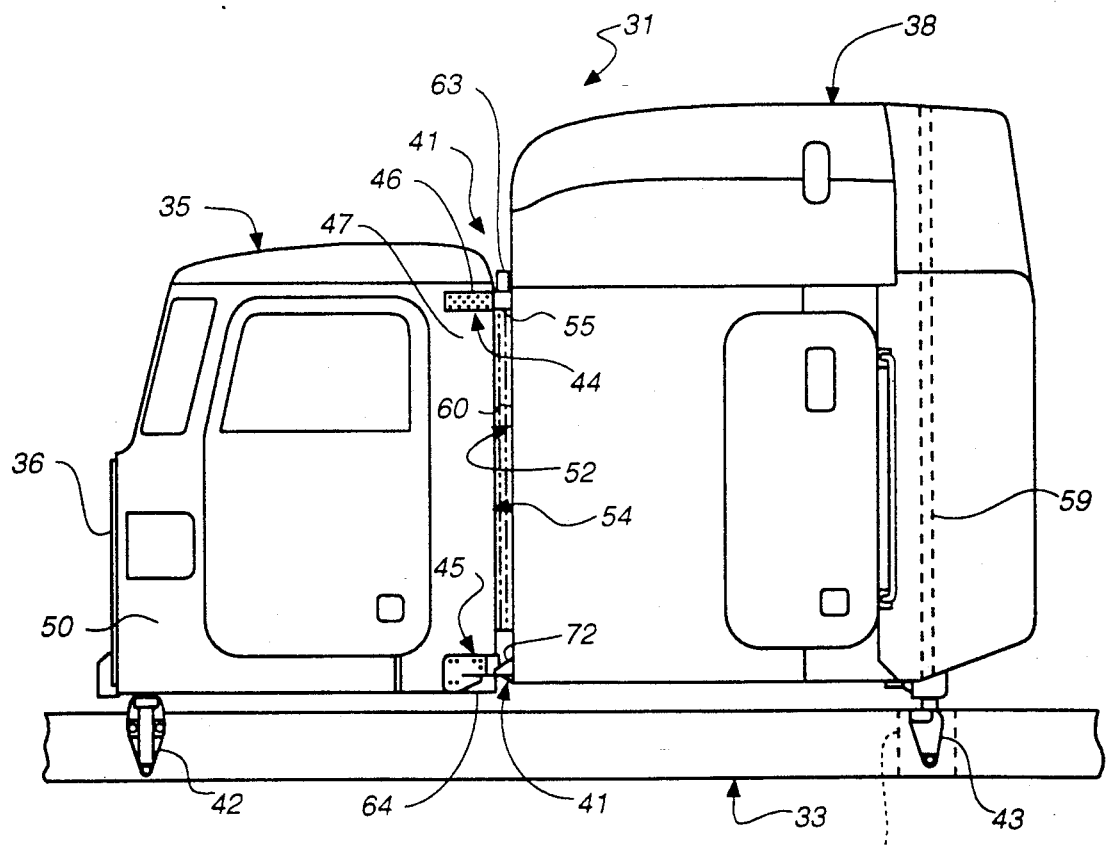
FIG._5

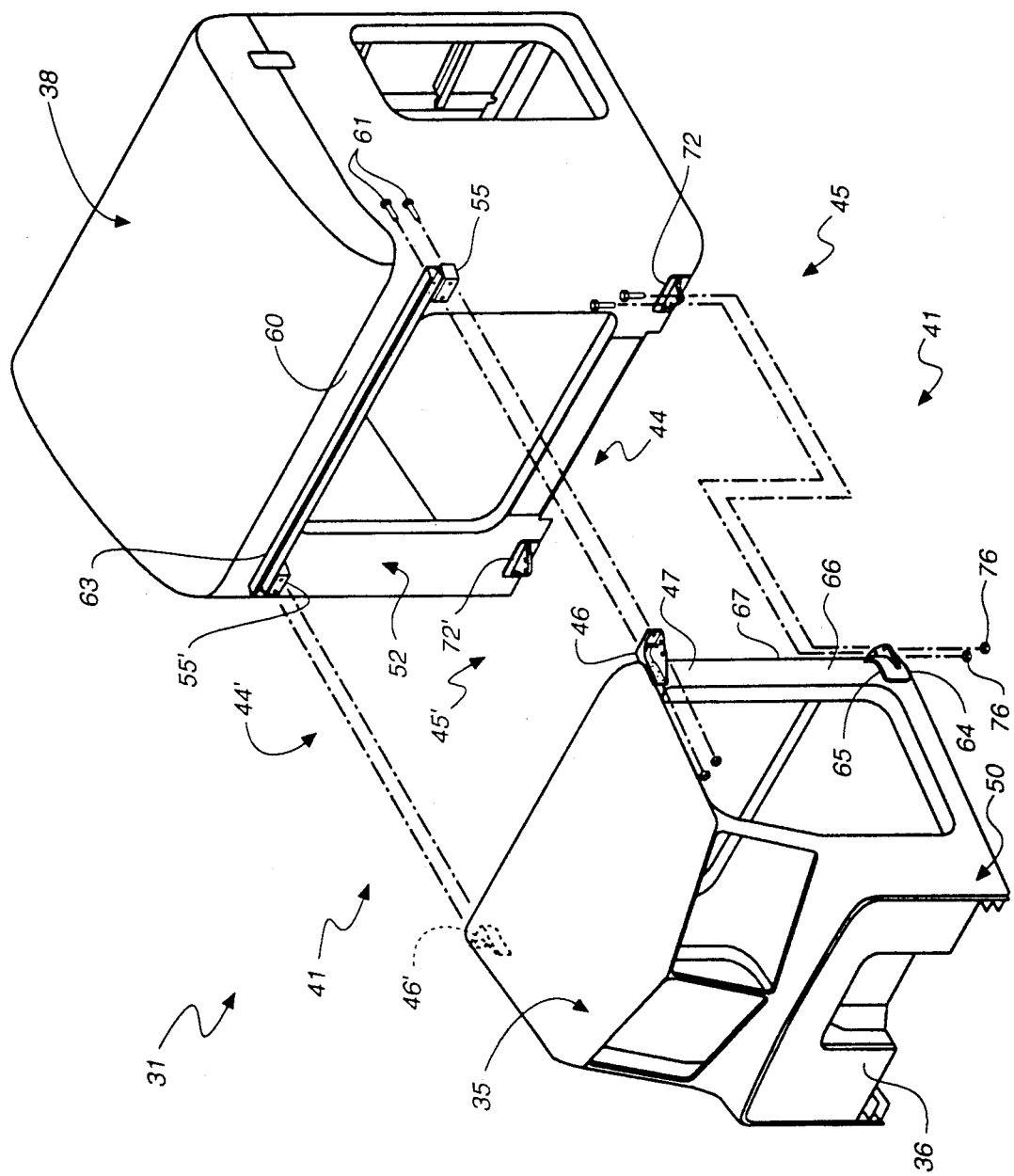

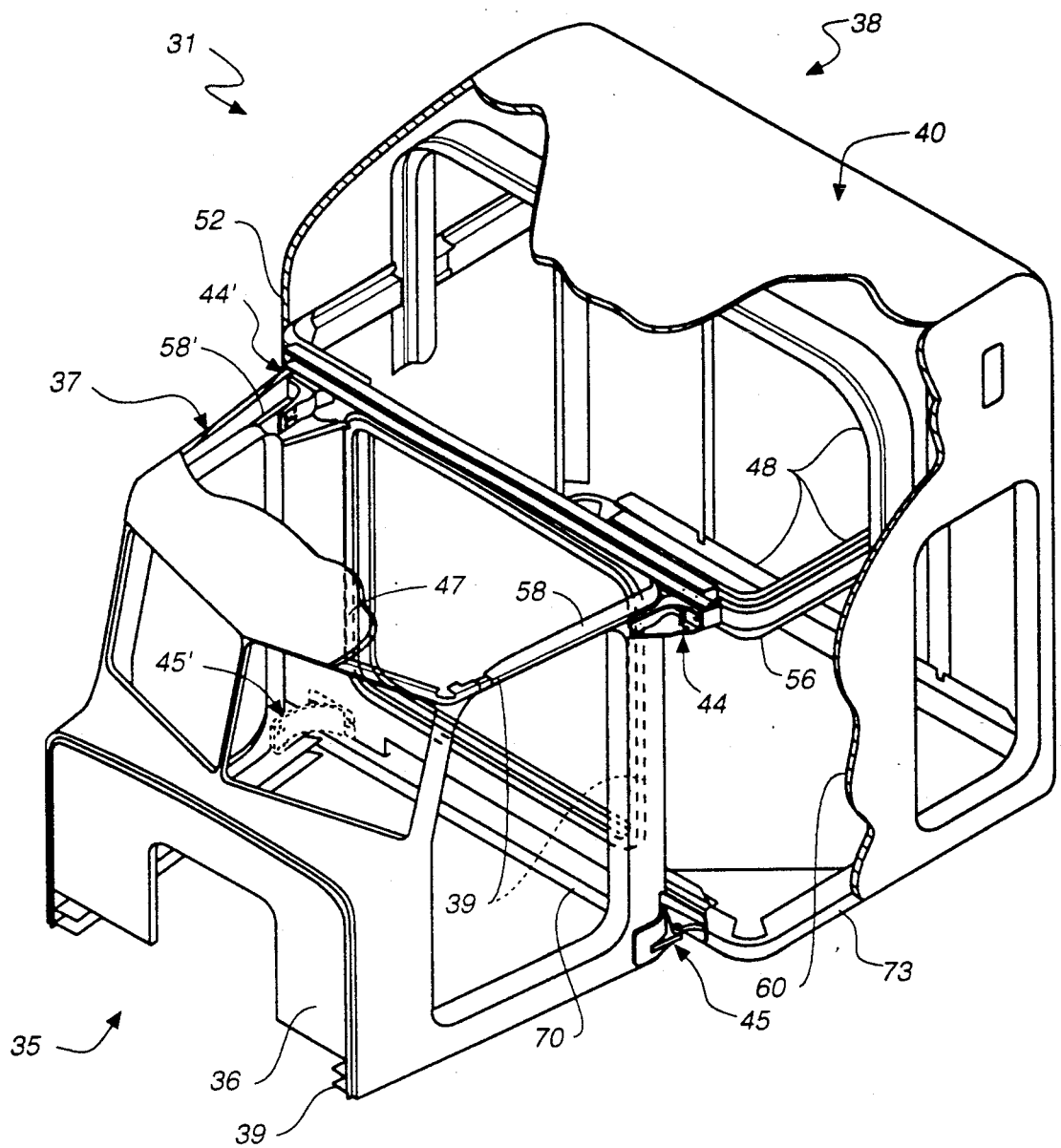
FIG._7

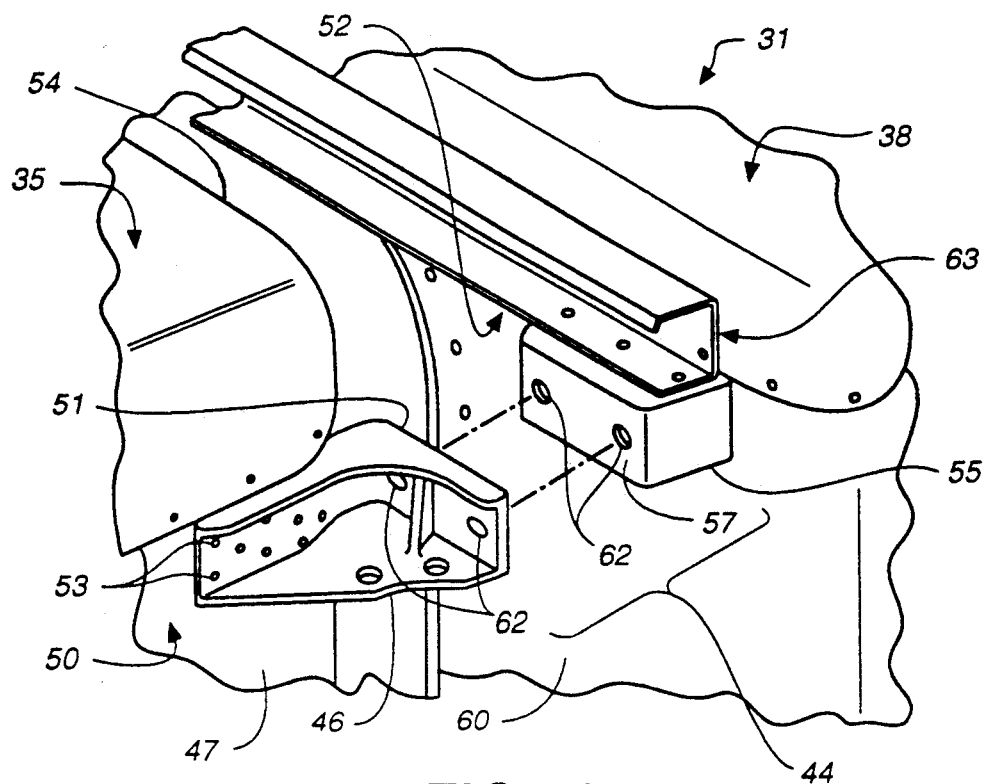
FIG._8
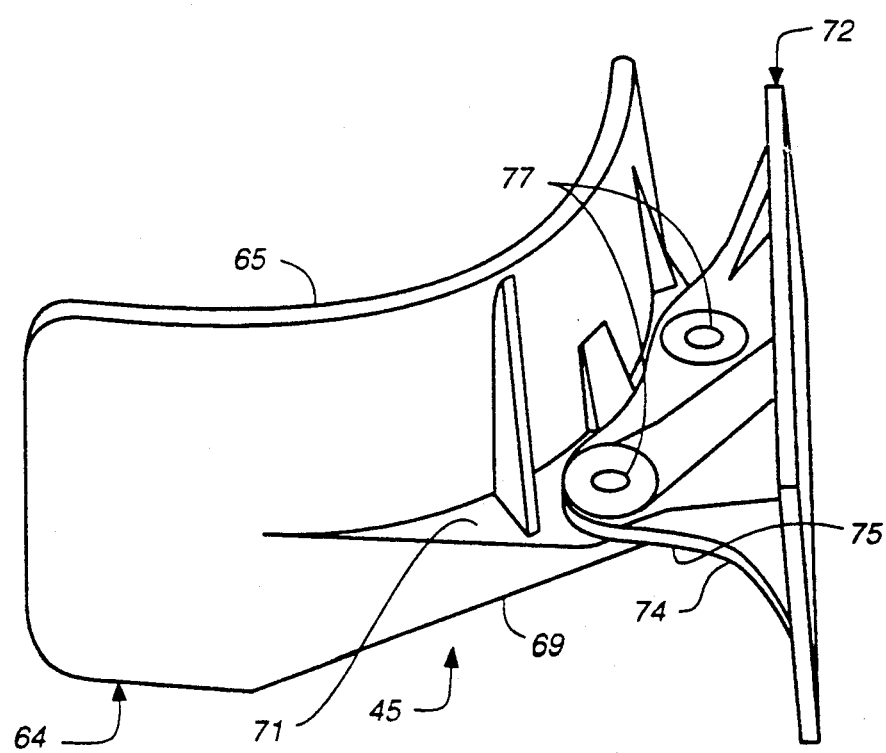
FIG._9

MODULAR CAB AND SLEEPER STRUCTURAL ASSEMBLY FOR A TRUCK-TRACTOR VEHICLE

TECHNICAL FIELD

The present invention relates, generally, to truck-tractor vehicles and, more particularly, to truck-tractor vehicles having sleeper box units.

BACKGROUND ART

Traditionally, long-haul truck-tractor vehicles 10, as shown in FIG. 2, are configured with sleeper units 11 which provide sleeping accommodation for truck operators during long hauls. Vehicle 10 is operated from a cab unit 12 (i.e., the driving compartment) which is positioned forward of sleeper unit 11. Generally, these cab and sleeper assemblies are constructed as either a structurally integral cab and sleeper assembly 14' (FIG. 2) or as separate cab and sleeper units 14 and 14'' (FIGS. 1 and 3).

Separate cab and sleeper assemblies 14 and 14'', are highly desirable since these configurations are capable of being constructed independent of one another which fosters configuration flexibility. Thus, these units are capable of different cab and sleeper configurations to suit customer needs. The sleeper unit 11, for example, may be purchased in a variety of lengths, heights, compartment layouts or the like. By comparison, the highly tooled cab unit 12 may remain unchanged and mounted to chassis frame 15.

Sleeper unit 11 is generally mounted to chassis frame member 15 at three discrete mounts 16. Chassis frame member 15, briefly, includes two longitudinally extending beams 25 positioned in a side-by-side spaced-apart relation which are coupled together by a plurality of transversely positioned cross-beams 26. Typically, two transversely spaced-apart front rubber mounts 16 coupled sleeper unit 11 to each longitudinal beam 25, respectively. A single rear rubber mount 16 positioned intermediate a rear portion of sleeper mount 11 and mounted to one cross-beam 26.

Cab unit 12 (i.e., the driving compartment) is positioned forward of sleeper unit 11 and is similarly mounted to chassis frame member 15 at three discrete mounts 16 which provide limited isolation from chassis frame member 15. To access sleeper unit 11 from cab unit 12, aligned ports or openings (not shown) are provided which extend through both cab rear wall 17 and the adjacent sleeper front wall 18. A rubber boot 19 spans the interface between cab unit 12 and sleeper unit 11 to seal assembly 14 and to provide weather protection.

This arrangement affords other benefits as well. Because sleeper unit 11 is often taller and wider than adjacent cab unit 12, crash damage during frontal impacts, roll-overs or jack-knifes is more confined to sleeper unit 11. Thus, repair to vehicle 10 may be more concentrated on the damaged portion (i.e., the sleeper unit) rather than also requiring removal or repair of overall cab and sleeper assembly 14 or cab 12. Non-productive time is minimized and repair costs are reduced, especially when considering the substantial complexity of cab unit 12.

However, by providing independent cab and sleeper units, it is more difficult to provide vibration and motion isolation of those units from chassis frame 15. Hence, the ride quality of each respective unit is compromised. The relatively short longitudinal span between the front and rear mounts 16 of each unit 11, 12 (FIG. 1) causes them to experience violent pitch motions. Individual cab and sleeper units 11, 12 yaw, pitch, roll, heave, surge and slip in directions opposite one another. Such relative motion therebetween necessitates the application of fairly flexible rubber boot joints 19, as set forth above. Despite their flexibility, these joints 19 can still be damaged which jeopardizes seal integrity. Further, wire harnesses, hoses, tubes or the like, extending between cab unit 12 and sleeper unit 11 must be designed for substantial mobility which increases the likelihood of component failure.

In one attempt to improve ride quality for separate cab and sleeper unit assembly 14, a pneumatic suspension component 20 with roll compliance replaces rear rubber mount 16 between chassis frame 15 and rear portions of individual units 11, 12 to provide better dampening. However, compliance of pneumatic suspension component 20 may be impeded because of the interfacing rubber boot 19 extending between cab rear wall 17 and sleeper front wall 18. Although rubber boot 19 is flexible in some directions, it is stiff enough to interfere with the independence of rear mounted pneumatic suspension component 20 as relative deflections between cab rear wall 17 and sleeper front wall 18 occur. Such interference greatly reduces the isolation performance and the effectiveness of the suspension. Another technique employed to improve ride quality is to structurally integrate cab unit 12' with sleeper unit 11', as may be viewed in FIG. 2. Since integral structure is essentially a composite between the cab and sleeper unit, the overall structure mass is increased compared to either independent unit by itself. Further, the longer integral unit span, relative a longitudinal axis extending through integral cab and sleeper assembly 14', increases the moment of inertia about axes perpendicular to the longitudinal axis. A greater moment of inertia about these perpendicular axes tends to resist pitch movement thereabout which results in improved ride quality. Moreover, pneumatic suspension components 20 positioned proximate the rear of sleeper portion 11' can perform effectively without interference.

While these integral assemblies 14' have been adequate to improve ride quality in both the cab and sleeper portions, several problems are associated with these integral designs. The integral cab and sleeper assembly 14' precludes the modularity aspect which is highly desirable to both the manufacturer and the vehicle owner. Crash damage to the integral unit will not be confined to either cab unit 12' or sleeper unit 11'. Rather, structural damage will likely extend throughout the entire integral assembly. Further, cab and sleeper configuration selection is generally reduced. Moreover, the sleeper portion of the integral unit cannot be separated from the cab portion should the vehicle operator or owner choose to convert the truck-tractor vehicle to other than long-haul vocations.

Hybrid modular cab and sleeper unit assemblies 14'', as shown in FIG. 3, have been developed which retain separate cab and sleeper units while improving ride quality. Typically, these modular cab and sleeper assemblies 14'' incorporate an elongated sub-frame 21'' in which both cab unit 12'' and sleeper unit 11'' are rigidly mounted thereto and carried thereon to form a carriage assembly. Further, sleeper unit 11'' and cab unit 12'' may include opposing aligned flange portions 24'' and 25'' circumferentially positioned about the periphery of the interface opening therebetween which permit coupling of the units together at a plurality of locations. As shown in FIG. 3, a plurality of spaced-apart bolts 23" extend through and couple opposing flanges 24" and 25".

This carriage assembly is then mounted to chassis frame 15" at three or four discrete locations (i.e. rubber mounts 16") between sub-frame 21" and chassis frame 15". Hence, the longitudinal span between mounts 16" can be increased which reduces violent pitch motions, as above indicated. Moreover, isolation may further be improved by incorporating a pneumatic suspension component 20" with roll compliance at the rear portion of sub-frame 21".

This hybrid configuration (FIG. 3), however, is also inherent with associated design problems. Addition of sub-frame 21" substantially increases the overall weight of composite structure 14", which reduces operation efficiency. This configuration, further, impairs modularity since removal and installation of all peripheral bolts 23" is laboriously required. Conversion to "no-sleeper" vocations is also severely impeded since removal of sleeper unit 11" also requires removal of sub-frame 21". Finally, subframe 21" increases the overall ride height of assembly 14".

DISCLOSURE OF INVENTION

Accordingly, it is an object of the present invention to provide a modular cab/sleeper structural assembly which provides improved ride quality to the vehicle operator.

It is another object of the present invention to provide a modular cab/sleeper structural assembly with increased structural integrity.

Another object of the present invention to provide a modular cab/sleeper structural assembly which functions as an integral unit.

Still another object of the present invention is to provide a modular cab/sleeper structural assembly which reduces relative motion between a cab unit and a sleeper unit.

Another object of the present invention is to provide a modular cab/sleeper structural assembly which retains modularity of the sleeper units.

Yet another object of the present invention is to provide a coupling assembly which may be retrofit to most modular cab and sleeper units without requiring substantial modification to the basic form of separate units.

It is a further object of the present invention to provide a modular cab/sleeper structural assembly which is durable, compact, easy to maintain, has a minimum number of components, is easy to use by unskilled personnel, and is economical to manufacture.

The present invention includes a modular cab/sleeper structural assembly for a truck-tractor vehicle comprising a chassis frame extending substantially longitudinal of the vehicle. A cab portion, having a cab structural assembly is mounted to the chassis frame by a first mount. A sleeper portion, having a sleeper structural assembly and positioned behind the cab portion, is mounted to the chassis frame by a second mount coupled to the sleeper structure. Coupling members are located between the cab structural assembly and the sleeper structural assembly independently of the chassis frame. The coupling members fixedly join the sleeper structural assembly and the cab structural assembly together at discrete locations, forming a substantially unified composite structure and causing the composite structure to function as an integral unit.

In another aspect of the present invention, a method of improving ride quality and structural integrity of a cab and sleeper assembly mounted directly to a vehicle chassis frame of a truck-tractor vehicle comprises the steps of coupling a lower portion of the cab structure to a lower portion of the sleeper structure at spaced-apart locations to produce substantially decreased relative motion therebetween, and coupling an upper portion of the cab structure to an upper portion of the sleeper structure at spaced-apart locations to produce substantially decreased relative motion therebetween.

The assembly of the present invention has other objects and features of advantage which will be more readily apparent from the following description of the Best Mode of Carrying Out the Invention and the appended claims, when taken in conjunction with the accompanying drawing.

BRIEF DESCRIPTION OF THE DRAWING

The purpose and advantages of the present invention will be apparent to those skilled in the art from the following detailed description in conjunction with the appended drawings in which:

FIG. 1 is a side elevation view of a prior art cab and sleeper assembly illustrating mounting to a chassis frame.

FIG. 2 is a side elevation view of a prior art integral cab/sleeper assembly incorporated with a truck-tractor vehicle.

FIG. 3 is a side elevation view, partially broken away, of a prior art modular cab/sleeper assembly mounted to a sub-frame assembly.

FIG. 4 is a side elevation view of a truck-tractor vehicle employing a modular cab/sleeper structural assembly constructed in accordance with the present invention.

FIG. 5 is an enlarged, fragmentary side elevation view of the cab/sleeper structural assembly of FIG. 4 and illustrating the suspension mounts.

FIG. 6 is an isometric view of the cab/sleeper structural assembly of FIG. 4 showing the individual upper and lower coupling brackets.

FIG. 7 is an isometric view of the cab/sleeper structural assembly of FIG. 4 illustrating the upper and lower coupling brackets mounted to the individual structure frames of the cab unit and the sleeper unit.

FIG. 8 is an enlarged, isometric view of the upper coupling bracket assembly constructed in accordance with the present invention and mounted to the cab and sleeper units.

FIG. 9 is an enlarged, isometric view of the lower coupling bracket assembly constructed in accordance with the present invention.

BEST MODE OF CARRYING OUT THE INVENTION

The modular cab/sleeper structure for a truck-tractor vehicle of the present invention increases structural integrity between the cab unit and sleeper unit for improved ride quality while retaining modularity of the sleeper unit. While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

It will be noted here that for a better understanding, like components are designated by like reference numerals throughout the various figures. Attention is now directed to FIG. 4, where a long-haul or truck-tractor vehicle, generally designated 30, is illustrated incorporating a modular cab/sleeper structural assembly, generally designated 31, of the present invention. Briefly, truck-tractor vehicle 30 includes chassis 32 having a pair of side-by-side and spaced-apart longitudinally extending chassis frame members 33 coupled together by a plurality of cross beams 49 transversely extending therebetween. Wheels 34 and an engine (not shown) are coupled to chassis 32 for operable use. Further, a cab unit 35 which houses the driving compartment is also positioned atop and supported by chassis frame members 33. Cab unit 35 includes a cab structural assembly 37 (FIG. 7) which provides stability and rigidity to cab unit 35. Cab structural assembly 37 generally includes a cab frame network 39 and a cab exterior skin portion mounted thereon which cooperate to distribute loads. A sleeper unit, generally designated 38, providing temporary sleeping accommodations, is positioned rearward and adjacent to cab unit 35. Similarly, sleeper unit 38 includes a sleeper structural assembly 40 (FIG. 7) which provides stability and rigidity thereto. Sleeper structural assembly 40 includes a sleeper frame network 48 and a sleeper exterior skin portion mounted thereon which cooperate to distribute loads. Coupling means 41, coupled between cab structural assembly 37 and sleeper structural assembly 40 independently of chassis structural assembly 33, couples sleeper structural assembly 40 and cab structural assembly 37 together. This configuration forms a statically and dynamically unified composite structure for increased structural integrity therebetween which causes the composite structure to function as an integral unit.

Strength and stiffness of a structure can be proportional to the transverse cross-sectional area thereof. In accordance with the present invention, coupling means 41 expands this cross-sectional area to the boundary defined between the discrete coupling joints which will be described below. This substantial area proportionately increases rigidity therebetween which is a significant improvement over prior art modular cab/sleeper assemblies. Moreover, strength and rigidity are accomplished without employing a subframe.

As a result, ride quality is vastly improved over other modular cab/sleeper assemblies. Accordingly, the present invention provides a modular cab/sleeper assembly which affords all the benefits of a structurally integral cab/sleeper assembly without increasing the overall weight or height, while retaining the advantages of separate cab and sleeper modules.

First, ride quality can generally be improved because the increased structural strength and rigidity at these discrete coupling points between cab unit 35 and sleeper unit 38 permit omission of both the pneumatic suspension mount 20 (prior art assembly of FIG. 1) located at the rear of cab unit 35 and the two elastomeric suspension mounts 16 (prior art assembly of FIG. 1) located at the front of sleeper unit 38 without structural compromise therebetween. Hence, as shown in FIG. 5, modular cab/sleeper structural assembly 32 is isolated from chassis frames 33 using only a pair of spaced-apart front mounts 42, transversely positioned proximate the front portion of cab unit 35, and a pair of spaced-apart rear mounts 43, positioned proximate the rear portion of sleeper unit 38. The mounting distance, in effect, between the front and rear mounts 42 and 43, respectively, along the longitudinal axis of cab/sleeper structural assembly 31 is increased. This significant increase in the mounting base provides more stability (i.e., similar to prior art cab/sleeper assemblies of FIGS. 2 and 3) so that relative pitch of assembly 31 can be reduced. In contrast, the cab and sleeper 11 and 12 of FIG. 1, mounted directly to chassis frame 15, have relatively short mounting bases for each independent unit.

Moreover, the composite mass of the modular cab/sleeper structural assembly 31 of the present invention carries more inertia. In particular, the longer assembly span together with the increased mass causes the moment of inertia about axes perpendicular to the longitudinal axis to increase. Accordingly, an increased moment of inertia about these axes results in more resistance to relative pitch which, in turn, improves ride quality.

Finally, rear mount 43 mounted proximate the rear portion of cab/sleeper structural assembly 31 may include pneumatic and/or hydraulic suspension components (FIG. 5) with roll compliance, the application of which may be employed interference free for full compliance. Each rear suspension mount 43 is preferably provided by a pair of dampening components (i.e., a hydraulic shock or the like, not shown separately) working in concert with a pair of support suspension/isolation components (i.e., a air bag or spring unit, not shown separately) to suspend and isolate cab/sleeper structural assembly 31 from chassis frame means 33.

In the preferred form and as shown in FIG. 5, rear suspension mount sets 43 are spaced-apart and are positioned proximate the intersection between a vertical plane containing the sleeper unit rear wall 59 and chassis frame members 33. Because rear wall 59 is inherently stiff and strong, an abundance of reserve load path capacity for increased structural reaction may be provided by placing rear mounts 43 in this arrangement.

FIG. 5 further illustrates that the front portion of structural assembly 31 is mounted to longitudinally extending chassis frame members 33 by individual mounts 42 positioned therebetween. Each mount 42 is proximately disposed in the vertical plane containing firewall 36 and in the cab side portions 50 (the other side of which is not shown). Similar to the placement of rear suspension mounts 43, this arrangement provides an abundance of reserve load path capacity for increased reactions. Accordingly, spaced-apart front mounts 42 and rear suspension mounts 43 provide a stable mounting base atop chassis frames 33 without requiring additional support structure. Isolation from chassis frame 33 is improved which further improves ride quality.

It will be understood that rear suspension 43 may be provided by a single elastomeric component or a single suspension/isolation component positioned between a central position of sleeper unit 38 and a cross-beam 49 (FIG. 5) transversely extending between spaced-apart chassis frame members 33. Further, rear suspension may be provided by a laterally extending leaf spring member. It will further be appreciated that the modular cab/sleeper structural assembly 31 of the present invention provides all the structural and dynamic ride advantages of an integral assembly while retaining the highly desirable separate unit modular concept. Moreover, unlike the modular cab/sleeper subframe assembly 14" of FIG. 3, the present invention provides the increased structural integrity of an integral assembly without substantially increasing the overall weight as with subframe 21 of the prior art assembly 14".

Turning now to FIGS. 5 and 6, cab/sleeper structural assembly 31 will be described in greater detail. It may be viewed that coupling means 41 generally includes an upper pair of discrete coupling members 44 and 44', and a lower pair of discrete coupling members 45 and 45'. Coupling members 44, 44' and 45, 45' cumulatively cooperate, together with corresponding exterior skins, and are strategically positioned relative one another (FIGS. 6 and 7) to substantially reduce yaw, roll, heave, surge, slip and pitch, relatively, between cab unit 35 and sleeper unit 38. These discrete coupling members, independent of chassis frame members 33, are suitably formed and dimensioned to rigidly couple cab structural assembly 37 and sleeper structural assembly 40 together so that modular cab/sleeper structural assembly 31 of the present invention functions as an integral unit. Hence, the static properties of modular assembly 31 are substantially similar to the integral cab/sleeper assembly 14' shown in FIG. 2.

It will be appreciated that the passenger-side upper coupling member 44' is the mirror image of the driver-side upper coupling member 44. Similarly, the passenger-side lower coupling member 45' is the mirror image of the driver-side lower coupling member 45. Therefore, only one upper coupling member 44 and one lower coupling member 45 will be discussed for the ease of description.

As best viewed in FIGS. 6 and 8, upper coupling member 44 includes two mating bracket members or a mating bracket set formed to securely couple together to create a substantially rigid mount. The first bracket is an upper cab bracket 46 formed to mount directly to an exterior skin 47 of an upper portion of cab side portion 50. Upper cab bracket 46 is essentially an L-shaped webbed bracket which provides a planar engaging surface 51 facing toward sleeper front wall 52 and which is oriented substantially vertically. Cab bracket 46 includes mounting fasteners 53 (FIG. 8), which further rigidly couple cab bracket 46 to cab structural assembly 37, as illustrated in FIG. 7. Hence, coupling cab bracket 46 to cab structural assembly 37 and to exterior skin 47 provides a sufficient path for the distribution of transmitted loads to fixed join the upper portions cab unit 35 and sleeper unit 38. More particularly, cab bracket 46 is aligned with a reinforcing longer on 58 strategically positioned proximate an upper rear corner of cab unit 35 for added stability. Bracket 46, hence, is positioned along an upper intersecting edge between cab rear wall 54 and cab side portion 50. However, depending on the specific cab assembly, cab bracket 46 may be repositioned in order to fixedly couple to cab structural assembly 37.

Upper coupling member or mating bracket set 44 further includes an upper sleeper bracket 55 directly mounted to sleeper structural assembly 40 through front wall 52 and sleeper frame network 48 through mounting fasteners (not shown). As shown in FIG. 7, sleeper frame network 48 includes an upper peripheral frame 56 preferably disposed in a horizontal plane and extending substantially peripherally around the interior portion of sleeper unit 38. Upper peripheral frame 56 together with an exterior skin 60 of sleeper front wall 52 also provide a sufficient path for the distribution of transmitted load therethrough. Upper sleeper bracket 55 provides an opposing engaging surface 57 oriented in a substantially vertical plane and formed to mate with engaging surface 51 of cab bracket 46. It will be understood that frame 56 may be integral with skin 60 so that a sufficient thickening of the skin at the appropriate regions acts as a load distribution frame. Additionally, frame 56 may be mounted to an exterior portion of skin 60 without departing from the true spirit and nature of the present invention.

Once upper cab and sleeper brackets 46, 55, are properly aligned and mounted to the respective walls, coupling bolts 61 (FIG. 6) extend through aligned apertures 62 (FIG. 8) to secure vertically opposed engaging surfaces 51, 57 together. In accordance with the present invention, this coupling structurally unifies upper portions of cab unit 35 and sleeper unit 38 so that they may cooperate as an integral unit. To reduce bending and buckling tendencies between the driver-side upper sleeper bracket 55 and the passenger-side upper sleeper bracket 55', a laterally disposed beam member 63 extends therebetween. Beam member 63 further augments the strength of frame member 56 during load periods. As best illustrated in FIG. 8, beam member 63 is C-shaped and is rigidly coupled to the top portions of upper sleeper brackets 55 and 55' and to front sleeper wall 52.

Similarly, as shown in FIGS. 6, 7 and 9, lower coupling member or lower bracket set 45 includes two mating brackets members securely mounted together to form a substantially rigid coupling. For the reasons described further below, lower coupling member 45 is substantially more massive and configured to assume greater transmitted loads than upper coupling member 44. A lower cab bracket 64 includes a rounded mounting surface 65 formed to directly mount to an exterior skin 66 proximate a rounded edge portion 67 formed between cab side portion 50 and cab rear wall 54 (FIG. 6). Fasteners (FIG. 7) similarly extend through exterior skin 66 to a lower U-shaped reinforcing frame portion 70 of cab structural assembly 37 which couples lower cab bracket 64 thereto. Similar to upper coupling member 46, mounting lower cab bracket 64 to cab structural assembly 37 and to the exterior skin 66 provides a sufficient path for the distribution of transmitted loads to statically join the lower portions cab unit 35 and sleeper unit 38. Further, as shown in FIG. 9, lower cab bracket 64 preferably includes an outward extending lip portion 69 having upwardly facing engaging surface 71 oriented in a substantially horizontal plane.

FIG. 9 illustrates that lower coupling member 45 includes a mating lower sleeper bracket 72 which mounts to sleeper structural assembly 40 through sleeper front wall 52 and sleeper frame network 48. As shown in FIG. 7, sleeper frame network 48 includes a lower peripheral frame 73 preferably disposed in a horizontal plane and extending substantially peripherally around sleeper unit 38. Lower peripheral frame 73 together with exterior skin 60 of sleeper front wall 52 provide a sufficient path for the distribution of transmitted loads therethrough. Lower sleeper bracket 72, as best viewed in FIG. 9, provides a ledge portion 74 including a downwardly facing engaging surface 75 formed and dimensioned to engage upwardly facing engaging surface 71 of lower cab bracket 64.

Similarly to upper coupling members 44 and 44', once lower cab and sleeper brackets 64, 72 are properly aligned and mounted to the respective walls, coupling bolts 76 (FIG. 6) extend through aligned apertures 77 (FIG. 9) to secure horizontally opposed engaging surfaces 71, 75 together. In accordance with the present invention, this coupling statically and structurally unifies lower portions of cab unit 35 and sleeper unit 38 so that the may function as an integral unit.

Although each upper coupling member 44, 44' and each lower coupling member 45, 45' have been described as a mating bracket set, it will be understood that a single integral unit may be employed as long as the integral bracket fixedly joins the cab unit and sleeper unit at their respective structural assemblies. Further, it has been determined that the loads are primarily transmitted through the lower coupling members 45 and 45'. Therefore, the mating lower bracket members 64 and 72, and 64' and 72' must be configured and robust enough to relate cab unit 35 and sleeper unit 38 in yaw, roll, heave, surge and slip directions. In contrast, upper coupling members 44 and 44' need only be configured to control relative pitch therebetween which is biased toward compressive loading.

Upper and lower discrete coupling members 44, 44' and 45, 45' are preferably composed of metallic materials or the like which provide sufficient stiffness and strength. Coupling members or bracket sets 44, 44' and 45, 45' must also be properly designed to prevent fracture or fatigue failure during periods of substantial load.

It will be appreciated that upper and lower coupling members 44, 44' and 45, 45' may be provided by a single integral bracket without departing from the true spirit and nature of the present invention. However, in accordance with the present invention, integral upper and lower coupling members must be mounted directly to major structural assemblies 37 and 40 thereof so that sufficient load paths may be provided. Further, the arrangement between the horizontally oriented engaging surfaces 71 and 75 of lower coupling member 45, and of the vertically oriented engaging surfaces 51 and 57 of upper coupling member 44 permits easier installation or removal of sleeper unit 38 from cab unit 35 during manufacture (i.e., facilitating modularity). Hence, depending on the particular installation, it will be understood that engaging surfaces may be oriented in different planes without diminishing properties therebetween.

Preferably, upper and lower coupling members 44, 44' and 45, 45' are exteriorly mounted to the respective exterior skins of cab unit 35 and sleeper unit 38 so that retrofitting can be accommodated. However, as above-indicated, the upper and lower brackets must also be mounted directly to major frame members thereof. Further, as previously mentioned, the frame members may be integral with the skins of the cab unit and the sleeper unit by providing skins with sufficiently thick regions upon which the coupling members are attached.

In another aspect of the present invention, a method of improving ride quality and structural integrity of modular cab/sleeper assembly 32 for truck-tractor vehicle 30 is provided which comprises the steps of coupling a lower portion of cab structural assembly 37 to a lower portion of sleeper structural assembly 40 at spaced-apart locations between the cab structure and the sleeper structural assembly to produce substantially decreased relative motion therebetween. The method further includes coupling an upper portion of cab structural assembly 37 to an upper portion of sleeper structural assembly 40 at spaced-apart locations to produce substantially decreased relative motion therebetween.

The method in accordance with the present invention may further includes the steps of mounting cab structure 37 proximate a front portion thereof to chassis frame 33 by first mount means 42 at spaced-apart location transverse to cab unit 35 to produce a substantially stable mount thereof. Further, mounting sleeper frame 48 proximate a rear portion thereof to chassis frame 33 by second mount means 43 at spaced-apart location transverse to sleeper portion 38 to produce a substantially stable mount thereof.

What is claimed is:

1. A modular cab/sleeper structural assembly for a truck-tractor vehicle comprising:

chassis frame means extending substantially longitudinal of the vehicle, a cab portion having a cab structural assembly and being mounted to said chassis frame means by first mounting means positioned proximate a front end portion of said cab structural assembly;

a sleeper portion having a sleeper structural assembly positioned behind said cab portion and mounted to said chassis frame means by second mounting means coupled proximate a rear end portion of said sleeper structural assembly; and coupling means coupled between said cab structural assembly and said sleeper structural assembly independently of said chassis frame means, said coupling means fixedly joining said sleeper structural assembly and said cab sleeper structural assembly together at discrete locations forming a substantially unified composite structure and causing said composite structure to function as an integral unit.

2. The modular cab/sleeper structural assembly as defined in claim 1 wherein, said coupling means includes a pair of lower coupling members and a pair of upper coupling members.

3. The modular cab/sleeper structural assembly as defined in claim 2 wherein, said sleeper structural assembly includes a substantially peripherally extending lower sleeper frame member formed to couple to said lower coupling members, and a substantially peripherally extending upper sleeper frame member formed to couple to said upper coupling members.

4. The modular cab/sleeper structural assembly as defined in claim 2 wherein, said pair of lower coupling members are formed and dimensioned, and positioned in a spaced-apart relation, to substantially relate said cab structural assembly and said sleeper structural assembly in yaw, roll, heave, and surge and slip directions therebetween, and said pair of upper coupling members are formed and dimensioned, and positioned in a spaced-apart relation, to substantially relate said cab structural assembly and said sleeper structural assembly in relative pitch therebetween, said lower coupling members and said upper coupling members causing said cab structural assembly and said sleeper structural assembly to act as a unit.

5. The modular cab/sleeper structural assembly as defined in claim 3 further including:

a beam member laterally extends between said pair of upper coupling members.

6. The modular cab/sleeper structural assembly as defined in claim 5 wherein, said beam member is further mounted to said upper sleeper frame member.

7. The modular cab/sleeper structural assembly as defined in claim 6 wherein, said beam member is substantially C-shaped.

8. The modular cab/sleeper structural assembly as defined in claim 4 wherein,
   each said lower coupling member includes a lower cab bracket member mounted to said cab structural assembly and a lower sleeper bracket member mounted to said lower sleeper structural assembly, said lower cab bracket members being formed and dimensioned to rigidly couple to respective lower sleeper bracket members, and
   each said upper coupling member includes an upper cab bracket member mounted to said cab structural assembly and an upper sleeper bracket member mounted to said upper sleeper structural assembly, said upper cab bracket members being formed and dimensioned to rigidly couple to respective upper sleeper bracket members.

9. The modular cab/sleeper structural assembly as defined in claim 1 wherein,
   said cab portion includes a fire wall portion contained in a substantially vertical plane proximate a front portion thereof; and
   said first mounting means is disposed substantially within said vertical plane.

10. The modular cab/sleeper structural assembly as defined in claim 9 wherein,
    said first mounting means includes a pair of mounts spaced-apart in a transverse orientation relative said cab portion.

11. The modular cab/sleeper structural assembly as defined in claim 10 wherein,
    said first mounting means are comprised of rubber.

12. The modular cab/sleeper structural assembly as defined in claim 10 wherein,
    said second mounting means includes a pair of rear suspension mounts spaced-apart in a transverse orientation relative said sleeper portion.

13. The modular cab/sleeper structural assembly as defined in claim 12 wherein,
    each said rear suspension mount is provided by a damping component and a support suspension/isolation component.

14. The modular cab/sleeper structural assembly as defined in claim 13 wherein,
    said rear suspension mounts are positioned proximate the intersection between a plane containing sleeper portion rear wall and said chassis frame means.

15. The modular cab/sleeper structural assembly as defined in claim 13 wherein,
    said damping component is provided by a hydraulic shock absorber, and
    said suspension/isolation component is provided by an air bag.

16. The modular cab/sleeper structural assembly as defined in claim 10 wherein,
    said second mounting means includes a single mount positioned intermediate a rear portion of said sleeper portion.

17. A modular cab/sleeper structural assembly for a truck-tractor vehicle comprising:
    chassis frame means extending substantially longitudinal of the vehicle,
    a cab portion having a cab structural assembly and being mounted to said chassis frame means by first mounting means positioned proximate a front end portion of said cab structural assembly;
    a sleeper portion, including a sleeper structural assembly having a peripherally extending upper frame portion and a peripherally extending lower frame portion, said sleeper portion being positioned behind said cab portion and mounted to said chassis frame means by second mounting means coupled proximate a rear end portion of said sleeper structural assembly;
    an upper pair of bracket members coupled between said cab structural assembly and said upper sleeper frame portion at spaced-apart locations exterior to said cab portion and said sleeper portion; and
    a lower pair of bracket members coupled between said cab structural assembly and said lower sleeper frame portion at spaced-apart locations exterior to said cab portion and said sleeper portion;
    both said upper pair of bracket members and said lower pair of bracket members coupling said cab structural assembly and said sleeper structural assembly together at discrete locations independently of said chassis frame means and forming a substantially unified composite structure, and both cooperating to fixedly join said sleeper structural assembly and said cab structural assembly and causing said composite structure to function as an integral unit.

18. A method of improving ride quality and structural integrity of a modular cab/sleeper assembly for a truck-tractor vehicle including chassis frame means, a cab portion having a cab structural assembly and being mounted to said chassis frame means by first mounting means positioned proximate a front end portion of said cab structural assembly, and a sleeper portion having a substantially peripherally extending upper sleeper structural assembly and a substantially peripherally extending lower structural assembly, said sleeper portion being mounted to said chassis frame means by second mounting means positioned proximate a rear end portion of said sleeper structural assembly, said method comprising the steps of:
    coupling a lower portion of said cab structural assembly to said lower sleeper structural assembly at spaced-apart lateral locations by lower coupling members to produce substantially decreased relative motion therebetween, and
    coupling an upper portion of said cab structural assembly to said upper sleeper structural assembly at spaced-apart lateral locations by upper coupling members to produce substantially decreased relative motion therebetween.

19. The method as defined in claim 18 further including the step of:
    mounting said cab structural assembly proximate a front portion thereof to said chassis frame means by said first mounting means at spaced-apart location transverse to said cab portion to produce a substantially stable mount thereof; and
    mounting said lower sleeper structural assembly proximate a rear portion thereof to said chassis frame means by said second mounting means at spaced-apart location transverse to said sleeper portion to produce a substantially stable mount thereof.

20. A modular cab/sleeper structural assembly for a truck-tractor vehicle comprising:
    chassis frame means extending substantially longitudinal of the vehicle,
    a cab portion including a fire wall portion contained in a substantially vertical plane proximate a cab front portion thereof, and a cab structural assembly mounted to said chassis frame means by a pair of mounts disposed substantially within said vertical plane and spaced-apart in a transverse orientation relative said cab portion;

a sleeper portion including a rear wall and a sleeper structural assembly positioned behind said cab portion, said sleeper portion mounted to said chassis frame means by a pair of rear suspension mounts positioned proximate an intersection between a plane containing said rear wall and said chassis frame means, said pair of suspension mounts being spaced-apart in a transverse orientation relative said sleeper portion, and each rear suspension mount being provided by a damping component and a support suspension/isolation component; and coupling means coupled between said cab structural assembly and said sleeper structural assembly independently of said chassis frame means, said coupling means fixedly joining said sleeper structural assembly and said cab sleeper structural assembly together at discrete locations forming a substantially unified composite structure and causing said composite structure to function as an integral unit.

21. A method of improving ride quality and structural integrity of a modular cab/sleeper assembly for a truck-tractor vehicle including chassis frame means, a cab portion having a cab structural assembly and being mounted to said chassis frame means by first mounting means positioned proximate a front end portion of said cab structural assembly, and a sleeper portion having a substantially peripherally extending upper sleeper structural assembly and a substantially peripherally extending lower structural assembly, said sleeper portion being mounted to said chassis frame means by second mounting means positioned proximate a rear end portion of said sleeper structural assembly, said method comprising the steps of:

coupling a lower portion of said cab structural assembly to said lower sleeper structural assembly at spaced-apart lateral locations by lower coupling means to produce substantially decreased relative motion therebetween, coupling an upper portion of said cab structural assembly to said upper sleeper structural assembly at spaced-apart lateral locations by upper coupling members to produce substantially decreased relative motion therebetween;

mounting said cab structural assembly proximate a front portion thereof to said chassis frame means by said first mounting means at spaced-apart location transverse to said cab portion to produce a substantially stable mount thereof; and mounting said lower sleeper structural assembly proximate a rear portion thereof to said chassis frame means by said second mounting means at spaced-apart location transverse to said sleeper portion to produce a substantially stable mount thereof.

* * * * *